(12) United States Patent
Suzuki et al.

(10) Patent No.: US 11,809,895 B2
(45) Date of Patent: Nov. 7, 2023

(54) CONTROL DEVICE, CONTROL METHOD, AND PROGRAM

(71) Applicant: NIPPON TELEGRAPH AND TELEPHONE CORPORATION, Chiyoda-ku (JP)

(72) Inventors: Akito Suzuki, Musashino (JP); Masahiro Kobayashi, Musashino (JP); Shigeaki Harada, Musashino (JP); Ryoichi Kawahara, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 1038 days.

(21) Appl. No.: 16/468,089

(22) PCT Filed: Nov. 6, 2017

(86) PCT No.: PCT/JP2017/039907
§ 371 (c)(1),
(2) Date: Jun. 10, 2019

(87) PCT Pub. No.: WO2018/142700
PCT Pub. Date: Aug. 9, 2018

(65) Prior Publication Data
US 2020/0073697 A1    Mar. 5, 2020

(30) Foreign Application Priority Data

Feb. 2, 2017    (JP) ................................. 2017-017913

(51) Int. Cl.
*G06N 3/08*        (2023.01)
*G06F 9/46*        (2006.01)
(Continued)

(52) U.S. Cl.
CPC ........... *G06F 9/46* (2013.01); *G05B 13/0265* (2013.01); *G06N 3/006* (2013.01); *G06N 3/08* (2013.01); *G06N 7/01* (2023.01)

(58) Field of Classification Search
CPC ........................................................ G06F 9/46
(Continued)

(56) References Cited

U.S. PATENT DOCUMENTS 8,799,431 B2 * 8/2014 Pabari ................. H04L 41/0823
                                                          709/224
10,009,287 B2 * 6/2018 Djukic .................. H04L 47/724
(Continued)

FOREIGN PATENT DOCUMENTS

| JP | 2010-171758 A | 8/2010 |
| JP | 2013-168934 A | 8/2013 |
| WO | WO 2015/118874 A1 | 8/2015 |

OTHER PUBLICATIONS

International Search Report dated Jan. 23, 2018, in PCT/JP2017/039907 filed on Nov. 6, 2017.
(Continued)

*Primary Examiner* — Evral E Bodden
(74) *Attorney, Agent, or Firm* — Oblon, McClelland, Maier & Neustadt, L.L.P.

(57) ABSTRACT

A control device includes a first calculation unit configured to calculate for each control target a control solution for controlling said each control target; a second calculation unit configured to calculate an evaluation of the control solution for said each control target; a solution change unit configured to change the control solution based on the evaluation calculated by the second calculation unit; and a control unit configured to control said each control target based on the control solution changed by the solution change unit.

5 Claims, 10 Drawing Sheets

(51) Int. Cl.
  *G05B 13/02* (2006.01)
  *G06N 3/006* (2023.01)
  *G06N 7/01* (2023.01)

(58) Field of Classification Search
  USPC .......................................................... 706/25
  See application file for complete search history.

(56) References Cited

U.S. PATENT DOCUMENTS

| | | | |
|---|---|---|---|
| 10,827,366 B2* | 11/2020 | Senarath | H04L 43/026 |
| 2016/0352634 A1* | 12/2016 | Itsumi | H04L 41/22 |
| 2017/0213156 A1* | 7/2017 | Hammond | G06F 18/2148 |
| 2017/0318097 A1* | 11/2017 | Drew | H04L 41/0897 |
| 2017/0353991 A1* | 12/2017 | Tapia | H04W 24/02 |
| 2019/0349426 A1* | 11/2019 | Smith | H04L 61/4505 |
| 2020/0073697 A1* | 3/2020 | Suzuki | G06N 20/00 |
| 2020/0077892 A1* | 3/2020 | Tran | G08B 21/0492 |

OTHER PUBLICATIONS

Mijumbi, R. et al., "Management and Orchestration Challenges in Network Functions Virtualization", IEEE Communications Magazine, vol. 54.1, Jan. 2016, pp. 98-105.

Jiang, J. W. et al., "Joint VM Placement and Routing for Data Center Traffic Engineering", INFOCOM, The 31$^{st}$ Annual IEEE International Conference on Computer Communications: Mini-Conference, 2012, pp. 2876-2880.

Bouet, M. et al., "Cost-based placement of virtualized Deep Packet Inspection functions in SDN", IEEE Military Communications Conference (MILCOM), 2013, pp. 992-997.

Yoshida, M. et al., "MORSA: A multi-objective Resource Scheduling Algorithm for NFV infrastructure", Asia—Pacific Network Operation and Management Symposium (APNOMS), 2014, total 6 pages.

Tsagkaris, K. et al., "A survey of autonomic networking architectures: toward a Unified Management Framework", International Journal of Network Management, vol. 23, 2013, pp. 402-423.

Tsagkaris, K. et al., "Customizable Autonomic Network Management: Integrating Autonomic Network Management and Software-Defined Networking", IEEE Vehicular Technology Magazine, Mar. 2015, pp. 61-68.

* cited by examiner

CONTROL DEVICE, CONTROL METHOD, AND PROGRAM

TECHNICAL FIELD

The present invention relates to a control device, a control method, and a program.

BACKGROUND ART

Technologies called NFV (Network Functions Virtualization) have been known that combine a wide variety of virtual resources (VRs) and virtual network functions (VNFs) to provide various types of network services.

A VR may be, for example, a virtual machine (VM) that combines a CPU (Central Processing Unit), an HDD (Hard Disk Drive), a GPU (Graphics Processing Unit), an FPGA (Field Programmable Gate Array), and the like. Also, a VNF may be, for example, CPE (Customer Premises Equipment), a FW (Firewall), an LB (Load Balancer), DPI (Deep Packet Inspection), a proxy, an IDS (Intrusion Detection System), and NAT (Network Address Translation).

In NFV, VRs and VNFs are controlled by functions called "resource orchestration" and "service orchestration". Resource orchestration is a function of arranging VRs and VNFs on a physical network. Service orchestration is a function of calculating end-to-end paths that connect VRs and VNFs.

For example, as illustrated in FIG. 1, assume that a service provider provides three types of network services, namely, a service A to connect a user terminal with a VM via CPE, a FW, and an LB; a service B to connect a user terminal with another user terminal via DPI and a proxy; and a service C to connect a VM to another VM via an IDS and a FW. In this case, first, as illustrated as STEP 1) in FIG. 2, resource orchestration is executed by arranging VRs and VNFs on server devices on the physical network. Next, as illustrated as STEP 2) in FIG. 2, service orchestration is executed by calculating paths between the VRs and the VNFs arranged on the physical network.

However, the presence of a wide variety of VRs and VNFs makes it difficult to manually execute resource orchestration and service orchestration. Thereupon, it has been desired to implement an NFV orchestrator that automates NFV control.

To implement an NFV orchestrator, an integrated control algorithm has been known as an algorithm for executing resource orchestration and service orchestration (Non-Patent Document 1). In the integrated control algorithm, it is necessary to take into consideration all constraints that arise from combinations of control targets (paths, VRs, VNFs, etc.) so as to calculate a solution in accordance with all control purposes (minimization of link utilization, leveling of server utilization, etc.).

Two types of techniques related to the integrated control algorithm have been proposed, which are "centralized integrated control" (Non-Patent Document 2, Non-Patent Document 3, and Non-Patent Document 4) and "distributed integrated control" (Non-Patent Document 5 and Non-Patent Document 6).

The centralized integrated control is a technique that aims at simultaneous optimization by constructing a mathematical model that simultaneously takes multiple control targets into consideration. However, the centralized integrated control has been known for its low extensibility because the control algorithm needs to be rebuilt every time a control target is added, deleted, or changed.

In contrast, in the distributed integrated control, a "control engine" that executes the control algorithm is modularized, and by combining such modules, improvement of the extensibility is intended.

RELATED ART DOCUMENTS

Non-Patent Documents

Non-Patent Document 1: R. Mijumbi et al., "Management and Research Challenges in network functions vitalization", Communications Magazine, 54.1, pp. 98-105, 2016

Non-Patent Document 2: J. W. Jiang et al., "Joint VM Placement and Routing for data center engineering", INFOCOM, 2012

Non-Patent Document 3: M. Bouet, J. Leguy, and V. Conn, "Cost-based placement of vitalized dep package insertion functions in sdn", Military Communications Conference (MILCOM), 2013

Non-Patent Document 4: M. Yoshida et al., "MORSA Multi-objective resource scheduling algorithm for NFV infrastructure", Network Operations and Management Symposium (APNOMS), 2014

Non-Patent Document 5: K. Tsagkaris et al., "A Survey of Autonomic Networking architectures: towards a Unified Management Framework", International Journal of Network Management, 23.6, pp. 402-423, 2013

Non-patent Document 6: K. Tsagkaris et al., "Customizable Autonomic Network Management: Integrating Autonomic Network Management and Software-Defined Networking", Vehicular Technology Magazine, pp. 61-68, 2015

SUMMARY OF INVENTION

Problem to be Solved by the Invention

However, in the distributed integrated control, no specific control algorithm has been established and control engines are controlled independently from each other. For this reason, in the distributed integrated control, a result of control by a control engine may affect control of the other control engines, which may reduce the precision of a solution. Such an effect is also referred to as "control interference" or "solution interference".

The present invention is made in view of the above points and has an object to calculate a control solution that is highly extensible with respect to control targets and highly precise.

Means for Solving the Problem

Thereupon, in order to solve the problems described above, a control device includes a first calculation unit configured to calculate for each control target a control solution for controlling said each control target; a second calculation unit configured to calculate an evaluation of the control solution for said each control target; a solution change unit configured to change the control solution based on the evaluation calculated by the second calculation unit; and a control unit configured to control said each control target based on the control solution changed by the solution change unit.

Advantage of the Invention

It is possible to calculate a control solution that is highly extensible with respect to control targets and highly precise.

EMBODIMENTS OF THE INVENTION

In the following, embodiments of the present invention will be described with reference to the drawings.

<Overall Configuration>

Figure 1:
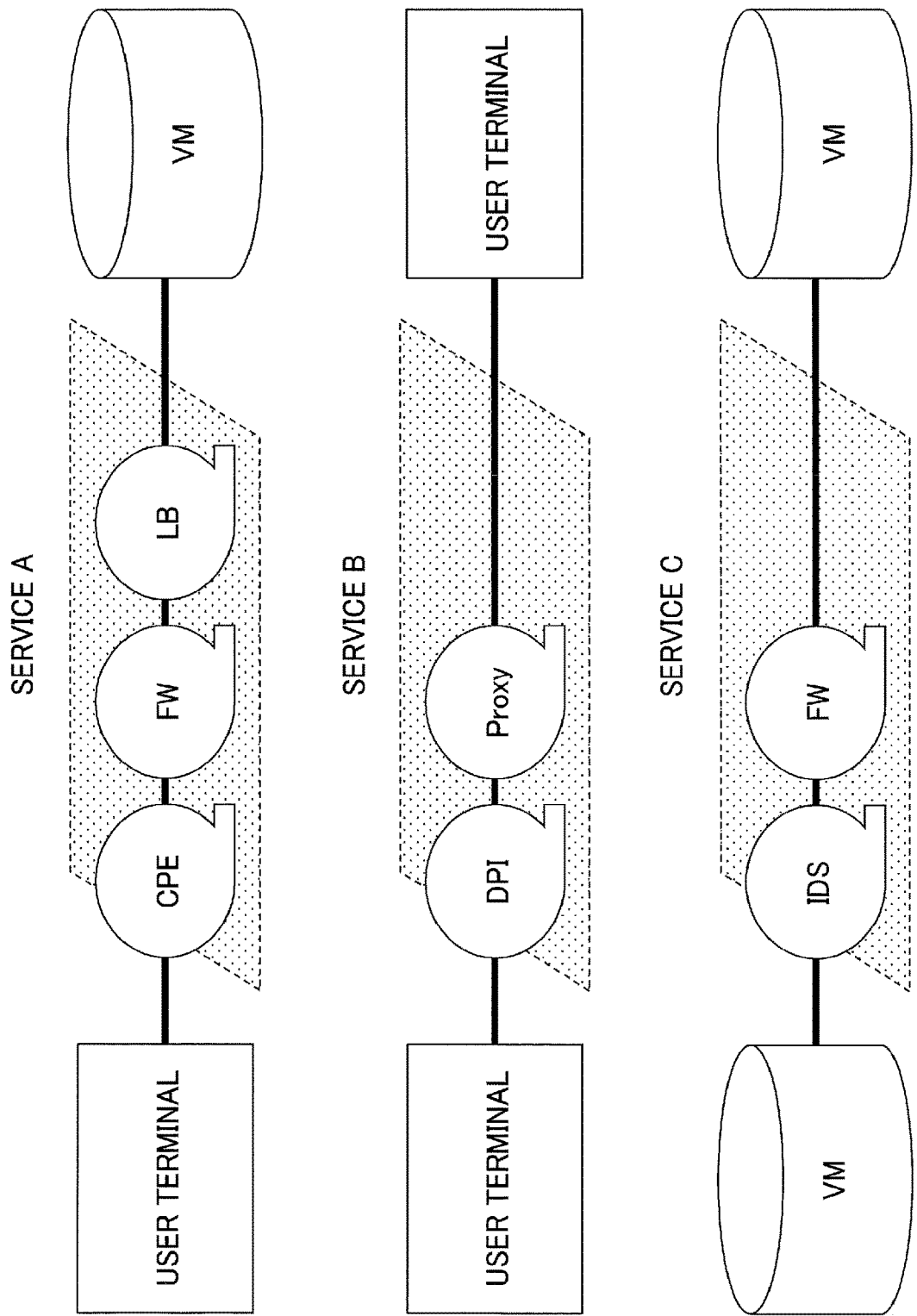
FIG. 1 is a diagram illustrating an example of network services constructed on a virtual network.
Figure 2:
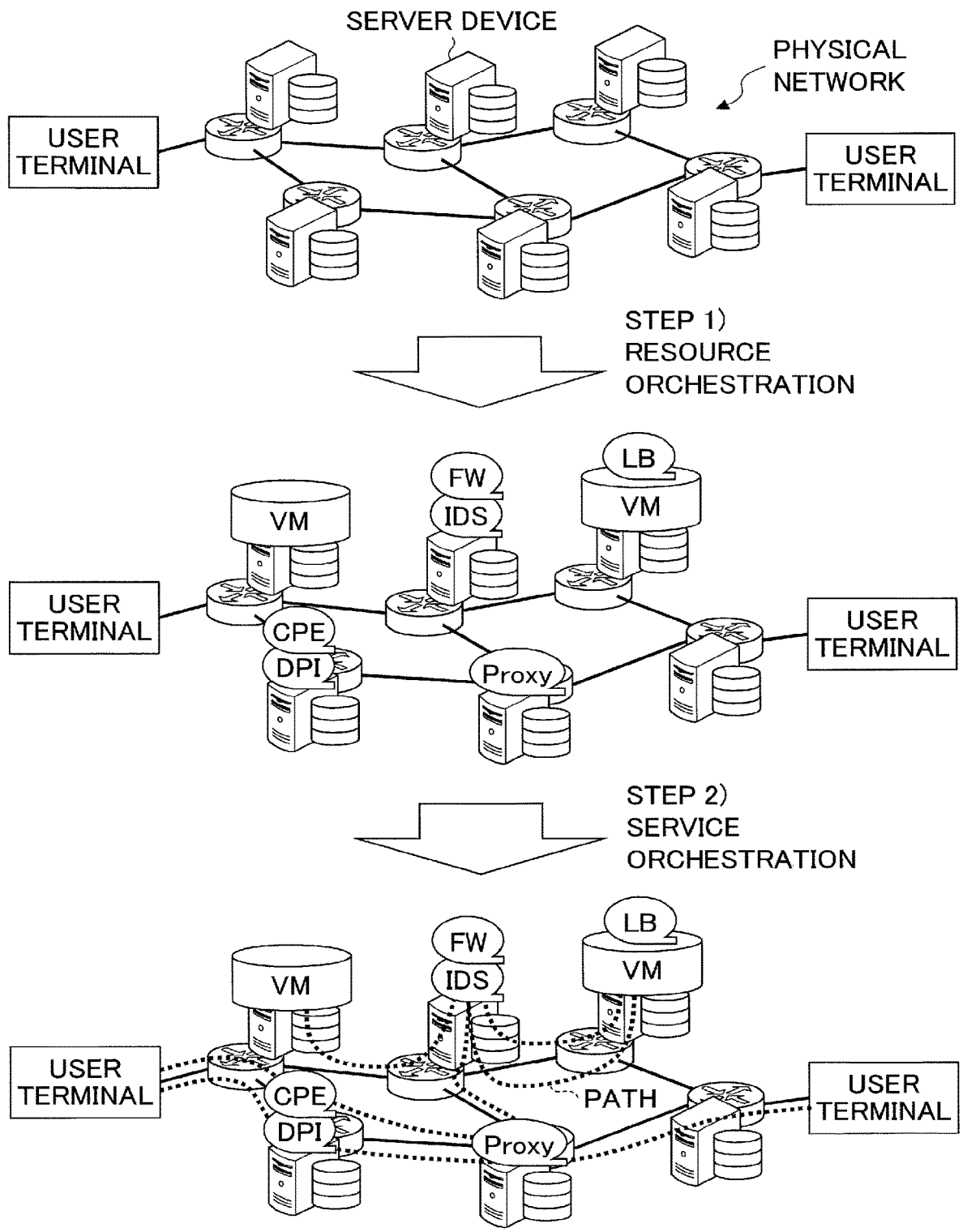
FIG. 2 illustrates an example of resource orchestration and service orchestration.
Figure 3:
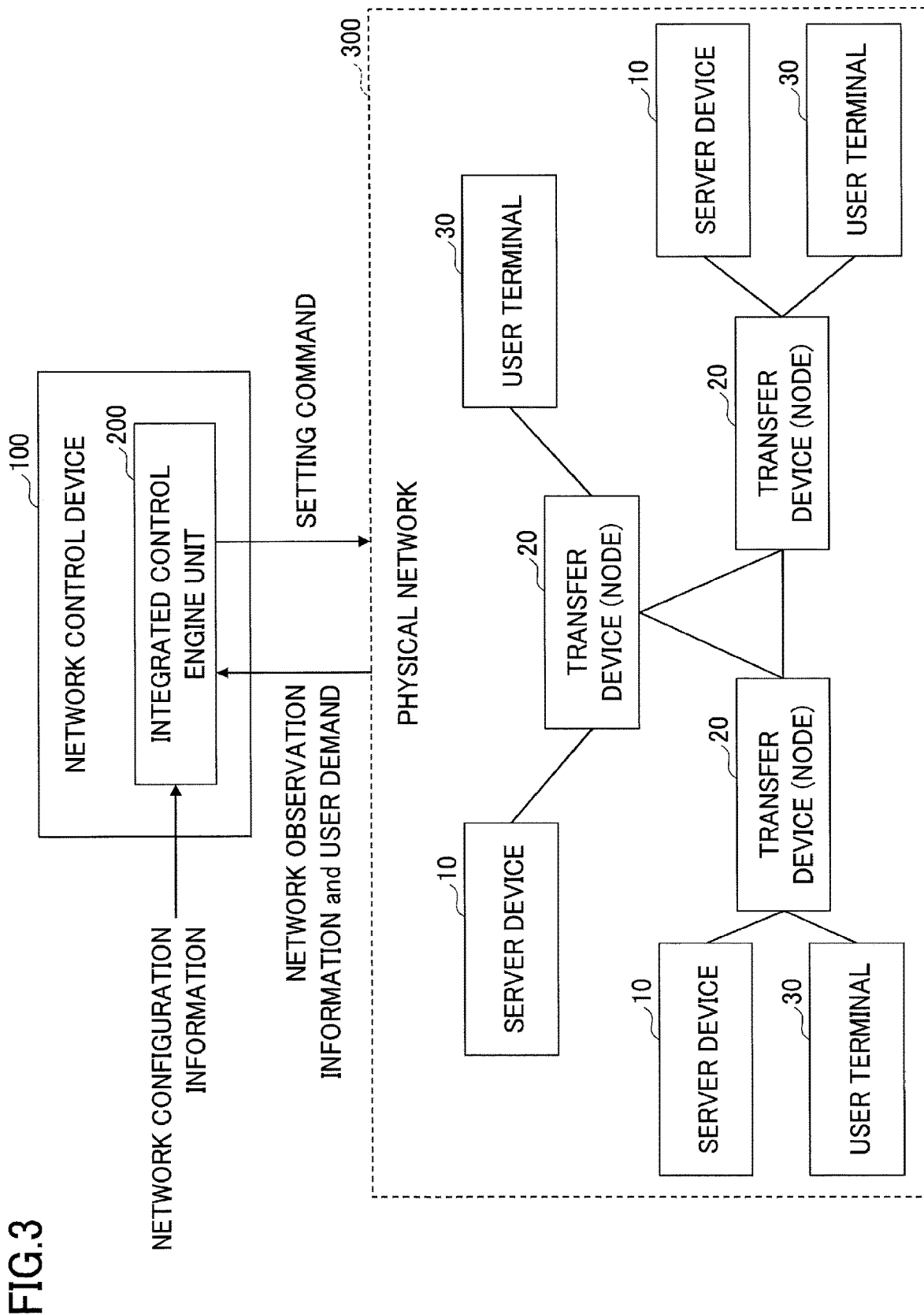
FIG. 3 is a diagram illustrating an example of an overall configuration according to an embodiment of the present invention.

First, an example of an overall configuration according to an embodiment of the present invention will be described with reference to FIG. 3. FIG. 3 is a diagram illustrating an example of an overall configuration according to an embodiment of the present invention.

As illustrated in FIG. 3, a network control device 100 is connected to a physical network 300. The physical network 300 is a network environment that includes server devices 10, transfer devices 20, and user terminals 30.

The network control device 100 is one or more computers having an integrated control engine unit 200. The network control device 100 controls the NFV environment on the physical network 300 by the integrated control engine unit 200.

In other words, the integrated control engine unit 200 controls the NFV by calculating an optimum arrangement of VRs and VNFs on the physical network 300 and optimum end-to-end paths connecting these VRs and VNFs. At this time, the integrated control engine unit 200 calculates the optimum arrangement and the optimum paths of the VRs and VNFs based on network observation information (traffic information, server use information, etc.) received from the physical network 300, user demands, and network configuration information.

Note that the network configuration information includes network topology information of the physical network 300 and constraint conditions of the resources (e.g., the capacity of each physical resource included in the physical network 300 (the server capacity of each server device 10, the link capacity of each transfer device 20, etc.)). Also, the traffic information includes the amount of data of a certain link included in the physical network 300. The server use information includes the utilization of a physical resource (e.g., CPU, memory, etc.) of the server device 10. The user demand includes demand information on VRs and VNFs (the amount of VRs and VNFs required for each user terminal 30) and constraint conditions of services (VRs and VNFs required to go through for each user terminal 30).

The NVF is controlled by transmitting a setting command corresponding to a solution (control solution) representing an optimum configuration and optimum paths calculated by the integrated control engine unit 200 to each server device 10 and each transfer device 20.

The server device 10 is one or more computers that implement VRs and VNFs arranged by the network control device 100. The server device 10 obtains server use information and transmits the obtained server use information to the network control device 100. Also, the server device 10 processes traffic and generates traffic according to the VRs and VNFs arranged by the network control device 100.

The transfer device 20 is a device that functions as a node to transmit traffic. The transfer device 20 obtains traffic information and transmits the obtained traffic information to the network control device 100. Also, the transfer device 20 processes traffic according to paths calculated by the network control device 100.

The user terminal 30 is one or more computers that transmit a traffic demand generated by a user's communication action (e.g., an operation to start using a service, etc.) to another user terminal 30, the server device 10, or the like. The user terminal 30 transmits a user demand to the network control device 100.

<Hardware Configuration of Network Control Device 100>

Figure 4:
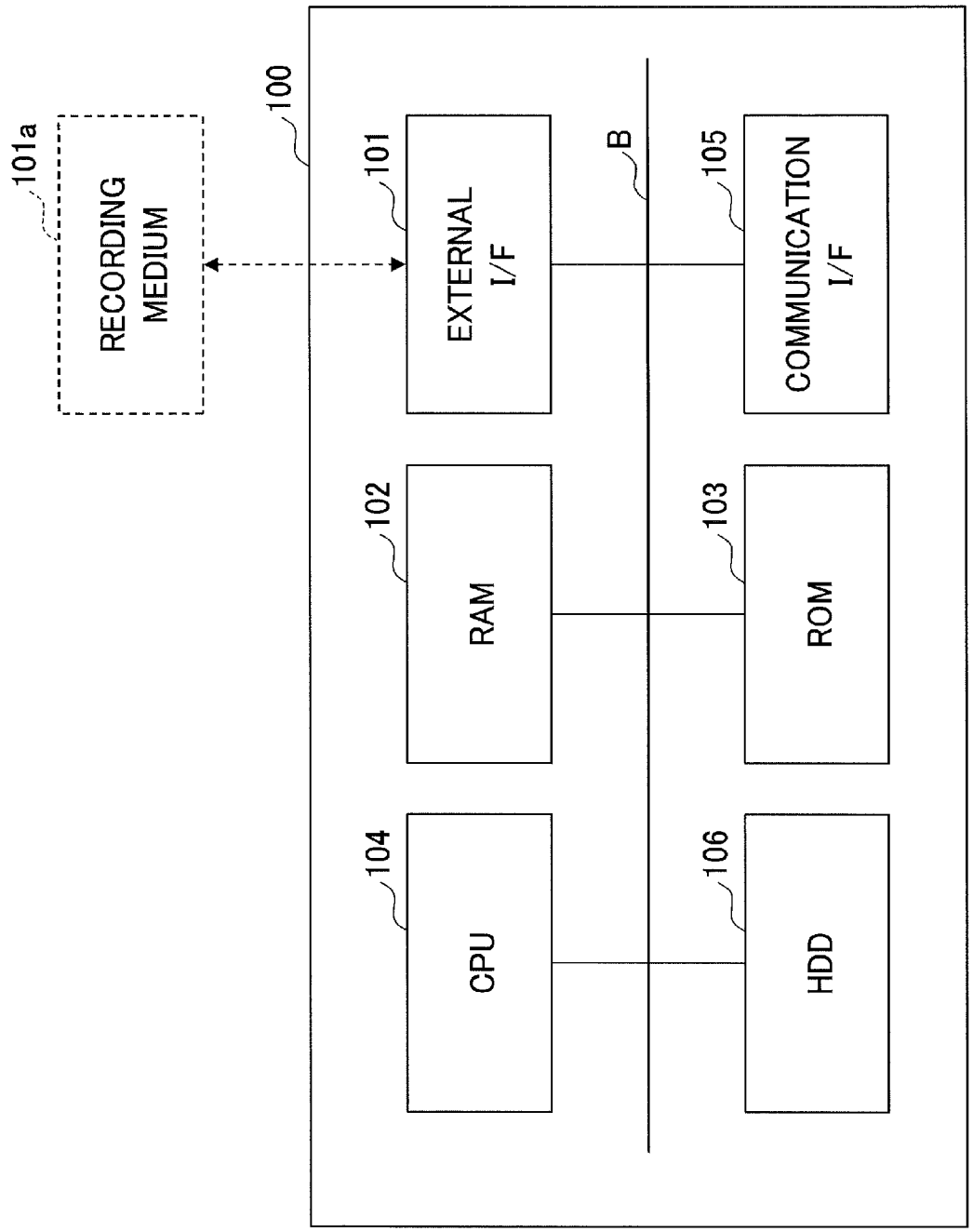
FIG. 4 is a diagram illustrating an example of a hardware configuration of a network control device according to an embodiment of the present invention.

Next, an example of a hardware configuration of the network control device 100 according to an embodiment of the present invention will be described with reference to FIG. 4. FIG. 4 is a diagram illustrating an example of a hardware configuration of the network control device 100 according to an embodiment of the present invention.

As illustrated in FIG. 4, the network control device 100 includes an external I/F 101, a RAM (Random Access Memory) 102, a ROM (Read-Only Memory) 103, a CPU 104, a communication I/F 105, and an HDD 106. These hardware units are communicatively connected with each other via a bus B.

The external I/F 101 is an interface with an external device. The external device includes a recording medium 101a. The network control device 100 can read from or write to the recording medium 101a through the external I/F 101.

The recording medium 101a may be, for example, a flexible disk, a CD (Compact Disc), a DVD (Digital Versatile Disk), an SD memory card (Secure Digital memory card), a USB (Universal Serial Bus) memory card, or the like.

The RAM 102 is a volatile semiconductor memory that temporarily holds programs and data. The ROM 103 is a non-volatile semiconductor memory that can hold programs and data even when the power is turned off. The ROM 103 stores, for example, OS (operating system) settings and network settings.

The CPU 104 is an arithmetic/logic unit that reads programs and data from the ROM 103 or the HDD 106 on the RAM 102 to execute processing. The communication I/F 105 is an interface for connecting the network control device 100 to the physical network 300.

The HDD 106 is an auxiliary storage device to store programs and data. The programs and data stored in the HDD 106 include, for example, an OS, application software that implements various functions on the OS, and a program that implements the integrated control engine unit 200. Note that the network control device 100 may include, for example, an SSD (Solid State Drive) as an auxiliary storage device.

Note that the network control device 100 may include, in addition to the hardware components described above, a display device such as a display and an input device such as a keyboard or a mouse.

By having the hardware configuration illustrated in FIG. 4, the network control device 100 according to the present embodiment can implement various processes as will be described later.

<Functional Configuration of Integrated Control Engine Unit 200>

Figure 5:
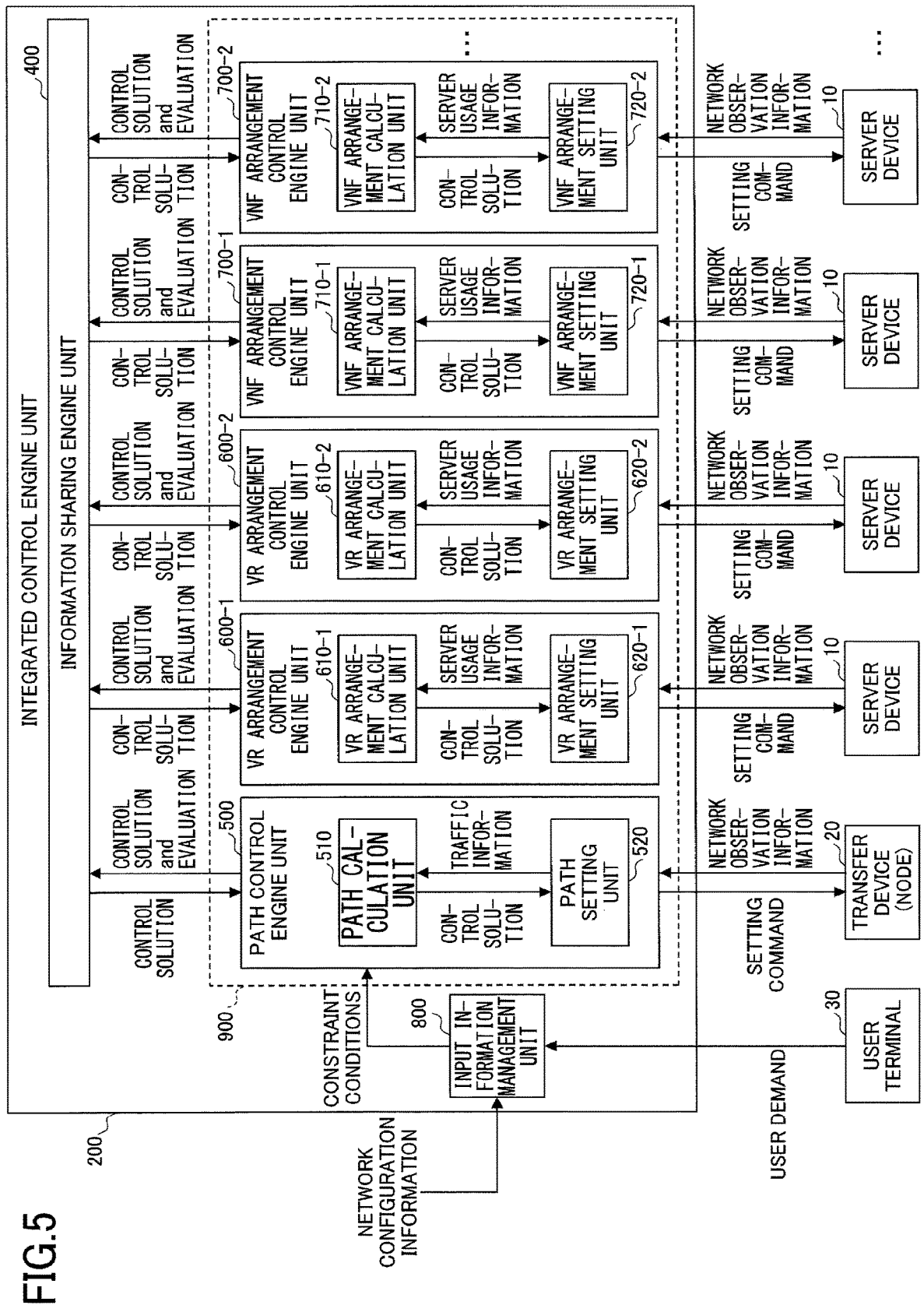
FIG. 5 is a diagram illustrating an example of a functional configuration of an integrated control engine unit according to an embodiment of the present invention.

Next, an example of a functional configuration of the integrated control engine unit 200 included in the network control device 100 will be described with reference to FIG. 5. FIG. 5 is a diagram illustrating an example of a functional configuration of the integrated control engine unit 200 according to an embodiment of the present invention.

As illustrated in FIG. 5, the integrated control engine unit 200 includes an information sharing engine unit 400, a path control engine unit 500, one or more VR arrangement control engine units 600, one or more VNF arrangement control engine units 700, and an input information management unit 800.

Note that in the following, when distinguishing multiple VR arrangement control engine units 600 from each other, the units are denoted as the "VR arrangement control engine unit 600-1", "VR arrangement control engine unit 600-2", and so on. Similarly, when distinguishing multiple VNF arrangement control engine units 700 from each other, the units are denoted as the "VNF arrangement control engine unit 700-1", "VNF arrangement control engine unit 700-2", and so on.

Also, when not distinguishing the path control engine unit 500, one or more VR arrangement control engine units 600, and one or more VNF arrangement control engine units 700 from each other, the unit(s) may be denoted as the "control engine unit(s) 900".

The input information management unit 800 receives as input the network configuration information and a user demand, converts the input network configuration information and the user demand into constraint conditions of each control engine unit 900, and outputs the constraint conditions to each control engine unit 900.

Note that the network configuration information is prepared in advance, for example, by a communication carrier that manages the physical network 300. Also, a user demand is created and input in response to, for example, an operation of the user of a user terminal 30.

The VR arrangement control engine unit 600 controls arrangement of a VR on the physical network 300 based on the constraint conditions and the network observation information.

The integrated control engine unit 200 includes a VR arrangement control engine unit 600 for each VR as a control target. For example, the integrated control engine unit 200 includes a VR arrangement control engine unit 600-1 for controlling the arrangement of a first VM, a VR arrangement control engine unit 600-2 for controlling the arrangement of a second VM, and so on.

Here, the VR arrangement control engine unit 600 includes a VR arrangement calculation unit 610 and a VR arrangement setting unit 620. The VR arrangement calculation unit 610 calculates a control solution of the control target and an evaluation of the control solution. The VR arrangement setting unit 620 transmits a setting command corresponding to an optimum control solution output by the information sharing engine unit 400 (i.e., a control solution having the highest overall evaluation, which will be described later) to the server device 10 or the like. This enables to control the VR as the control target.

The VNF arrangement control engine unit 700 controls arrangement of a VNF on the physical network 300 based on the constraint conditions and the network observation information.

The integrated control engine unit 200 includes a VNF arrangement control engine unit 700 for each VNF as a control target. For example, the integrated control engine unit 200 includes a VNF arrangement control engine unit 700-1 for controlling arrangement of an IDS and a VNF arrangement control engine unit 700-2 for controlling arrangement of a FW.

Here, the VNF arrangement control engine unit 700 includes a VNF arrangement calculation unit 710 and a VNF arrangement setting unit 720. The VNF arrangement calculation unit 710 calculates a control solution of the control target and an evaluation of the control solution. The VNF arrangement setting unit 720 transmits a setting command corresponding to an optimum control solution output by the information sharing engine unit 400 (i.e., a control solution having the highest overall evaluation, which will be described later) to the server device 10 or the like. This enables to control the VNF as the control target.

The path control engine unit 500 controls end-to-end paths connecting VRs and VNFs based on the constraint conditions and the network observation information.

Here, the path control engine unit 500 includes a path calculation unit 510 and a path setting unit 520. The path calculation unit 510 calculates a control solution of the control target and an evaluation of the control solution. The path setting unit 520 transmits a setting command corresponding to an optimum control solution output by the information sharing engine unit 400 (i.e., the control solution having the highest overall evaluation, which will be described later) to the transfer device 20 and the like. This enables to control the paths as the control targets.

Here, a control solution is information representing the amounts of the physical resources allocated to the control targets (paths, VR, VNF, etc.) and the allocated locations (arrangement location). Also, the evaluation of a control solution is information calculated by inputting the solution into an objective function of the control engine unit 900 (e.g., minimization of the link utilization, minimization of the latency, maximization of the quality, etc.).

However, the evaluation of a control solution may be calculated not only from an objective function but also from the constraint conditions. For example, the evaluation of a control solution may be a function value of a function that outputs "+1" if the constraint conditions are satisfied or "−1" if the constraint conditions are not satisfied.

Note that a control algorithm executed by each control engine unit 900 defines, for example, a control policy (improvement of quality, improvement of resource utilization efficiency, etc.) and constraint conditions (service provision conditions, link capacity, server capacity, etc.).

The information sharing engine unit 400 outputs an optimum control solution to each control engine unit 900. In other words, the information sharing engine unit 400 calculates an overall evaluation of the control solution based on control solutions and evaluations output from the control engine units 900 and changes the control solution based on the overall evaluation. Then, the information sharing engine unit 400 outputs the control solution having the highest overall evaluation (i.e., the optimum control solution) to each of the control engine units 900.

Note that if the information sharing engine unit 400 fails to satisfy the constraint conditions, a minimum value of evaluation of the control solution of each control engine unit 900 may be used as the overall evaluation. This enables to represent a conditional branch determining whether all the constraints of the control engine units 900 are satisfied.

As described above, the integrated control engine unit 200 includes modular control engine units 900 as in the distributed integrated control. Therefore, even if a control target is added, deleted, or changed (i.e., a VR or VNF is added, deleted, or changed), a modular control engine unit 900 may be added, deleted, or changed.

Also, the integrated control engine unit 200 includes the information sharing engine unit 400 for sharing information among these control engine units 900. This also enables to calculate a highly precise control solution that avoids "control interference".

Therefore, the integrated control engine unit 200 according to the present invention can calculate a control solution that is highly extensible with respect to control targets and highly precise. Also, due to the high extensibility, it is not necessary to construct a new algorithm when adding, deleting, or changing a control target, and it is possible to reduce OPEX (Operating Expense) and to accelerate provision of network services. Furthermore, calculation of a highly precise control solution enables to reduce the amount of physical resources required for providing network services and to reduce CAPEX (Capital Expenditure).

APPLICATION EXAMPLE

Next, an application example of the present embodiment will be described. In the following, as an example, a case will be described in which the information sharing engine unit 400 of the integrated control engine unit 200 is implemented by using a method of hierarchical reinforcement learning. Using a method of hierarchical reinforcement learning enables to efficiently obtain an optimum control solution by repeating improvement of a control solution (an initial solution) (i.e., change of the control solution) first calculated by each control engine unit 900.

(Integrated Control Engine Unit 200 in Application Example)

Figure 6:
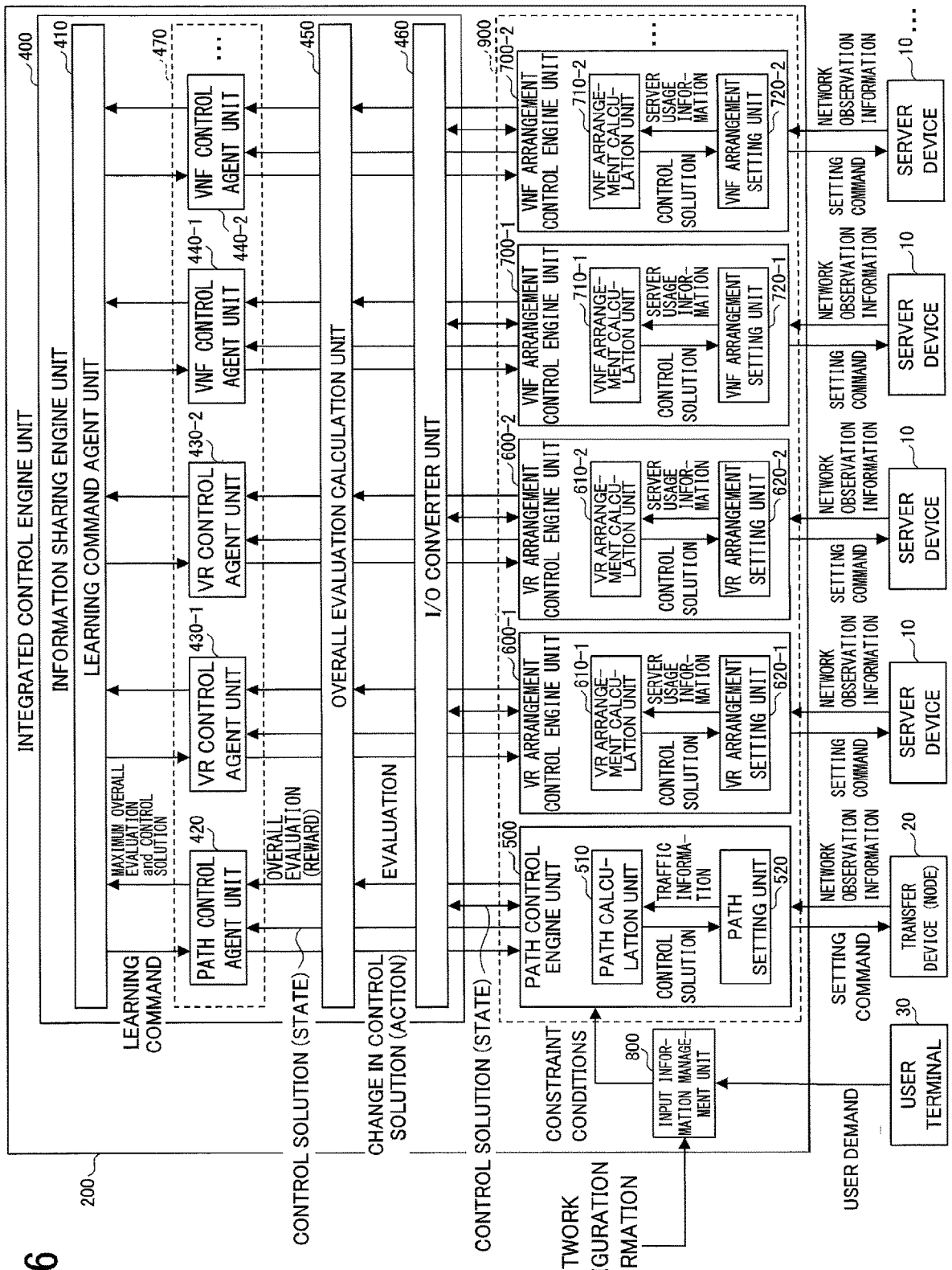
FIG. 6 is a diagram illustrating an example of a functional configuration of an integrated control engine unit in an application example.

First, an example of a functional configuration of the integrated control engine unit 200 according to the application example will be described with reference to FIG. 6. FIG. 6 is a diagram illustrating an example of a functional configuration of the integrated control engine unit 200 according to the application example.

As illustrated in FIG. 6, the information sharing engine unit 400 of the integrated control engine unit 200 includes a learning command agent unit 410, a path control agent unit 420, one or more VR control agent units 430, one or more VNF control agent units 440, an overall evaluation calculation unit 450, and an I/O converter unit 460.

Note that in the following, when distinguishing multiple VR control agent units 430 from each other, the units are represented the "VR control agent unit 430-1", "VR control agent unit 430-2", and so on. Similarly, when distinguishing multiple VNF control agent units 440 from each other, the units are represented as the "VNF control agent unit 440-1", "VNF control agent unit 440-2", and so on.

Here, the path control agent unit 420, the VR control agent units 430, and the VNF control agent units 440 are defined as "agents" in hierarchical reinforcement learning. Therefore, when not distinguishing the path control agent unit 420, the VR control agent units 430, and the VNF control agent units 440 from each other, these are represented as the "agent units 470".

The overall evaluation calculation unit 450 calculates overall evaluations from evaluations output by the control engine units 900.

The I/O converter unit 460 converts an input/output format for information sharing among the control engine units 900. For example, when output of the VR arrangement control engine unit 600 is converted into input of the path control engine unit 500, the I/O converter unit 460 converts, for example, arrangement information of VMs into server use information of the server devices 10 on which the VMs are arranged, so as to convert traffic information between the VMs to traffic information between the server devices 10. Note that such conversion is defined in advance for each combination of the control engine units 900 (combination of a control engine unit 900 as the conversion source and a control engine unit 900 as the conversion destination).

The learning command agent unit 410 learns to select an agent unit 470 based on overall evaluations calculated by the overall evaluation calculation unit 450. Here, a selection state of the agent units 470 is defined as a "state" in the hierarchical reinforcement learning. Similarly, a selection of an agent unit 470 is defined as an "action", and a maximum overall evaluation obtained while the selected agent unit 470 executes learning is defined as a "reward".

The agent units 470 (the path control agent unit 420, the VR control agent units 430, and the VNF control agent units 440) learn to change control solutions of the respective control engine units 900 based on overall evaluations calculated by the overall evaluation calculation unit 450. Here, a control solution of a control engine unit 900 is defined as a "state" in the hierarchical reinforcement learning. Similarly, a change in a control solution of each control engine unit 900 is defined as an "action". Similarly, the objective functions of each control engine unit 900 is defined as an evaluation, and an overall evaluation calculated by the overall evaluation calculation unit 450 from the evaluations of all the control engine units 900 is defined as a "reward".

The information sharing engine unit 400 includes an agent unit 470 for each control engine unit 900. For example, the path control engine unit 500, the VR arrangement control engine units 600-1 to 600-2, and the VNF arrangement control engine units 700-1 to 700-3 are included in the integrated control engine unit 200. In this case, the information sharing engine unit 400 includes the path control agent unit 420 corresponding to the path control engine unit 500; the VR control agent units 430-1 to 430-2 corresponding to the VR arrangement control engine units 600-1 to 600-2, respectively; and the VNF control agent units 440-1 to 440-3 corresponding to the VNF arrangement control engine units 700-1 to 700-3, respectively.

Configured as such to include an agent unit 470 for each control engine unit 900 enables the information sharing engine unit 400 to simply add, delete, or change an agent unit 470 even when a control engine unit 900 is added, deleted, or changed (i.e., a control target is added, deleted, or changed). Therefore, the information sharing engine unit 400 can add, delete, or change a control engine unit 900, for example, without changing the learning algorithm of each agent unit 470.

(Control Process Executed by Integrated Control Engine Unit 200 in Application Example)

In the following, as an example, a case will be described in which a path, arrangement of a VM as an example of VR, and arrangement of an IDS as an example of VNF are controlled. Therefore, it is assumed that the integrated control engine unit 200 includes the path control engine unit 500, the VR arrangement control engine unit 600 for controlling arrangement of the VM, and the VNF arrangement control engine unit 700 for controlling arrangement of the IDS.

However, a VR whose arrangement is controlled by the VR arrangement control engine 600 is not limited to a VM. Similarly, a VNF whose arrangement is controlled by the VNF arrangement control engine 700 is not limited to an IDS. A VNF whose arrangement is controlled by the VNF arrangement control engine 700 may be, for example, CPE, FW, LB, DPI, proxy, NAT, or the like.

Also, in order to simplify the description, the control process according to the application example will be described under the following assumptions.

- The target of a learning command issued by the learning command agent unit 410 includes the VR control agent unit 430 corresponding to the VR arrangement control engine unit 600 and the VNF control agent unit 440 corresponding to the VNF arrangement control engine unit 700.
- A user demand includes a VM demand, a VM size (e.g., the number of required CPU cores, HDD capacity, etc.), a traffic demand between VMs, and an IDS demand (whether an IDS is required or not).
- The objective function of the path control engine unit 500 is "minimization of the maximum link utilization", and the constraint condition is "link capacity".
- The objective functions of the VR arrangement control engine unit 600 and the VNF arrangement control engine unit 700 are "minimization of the maximum server utilization", and the constraint condition is "server capacity".

Note that the above assumptions are merely an example, and the present application example is not limited by the above assumptions. For example, as the objective function of the path control engine unit 500, "minimization of the average link transmission delay time" or the like may be used, and as the constraint condition, "transmission delay time of links", "transmission quality of links", or the like may be used. Also, for example, as the objective functions of the VR arrangement control engine unit 600 and the VNF arrangement control engine unit 700, "minimization of the maximum server power consumption" or the like may be used, and as the constraint condition, "processing capability of the CPUs provided on the server devices 10", "HDD capacity provided on the server devices 10", or the like may be used.

Figure 7:
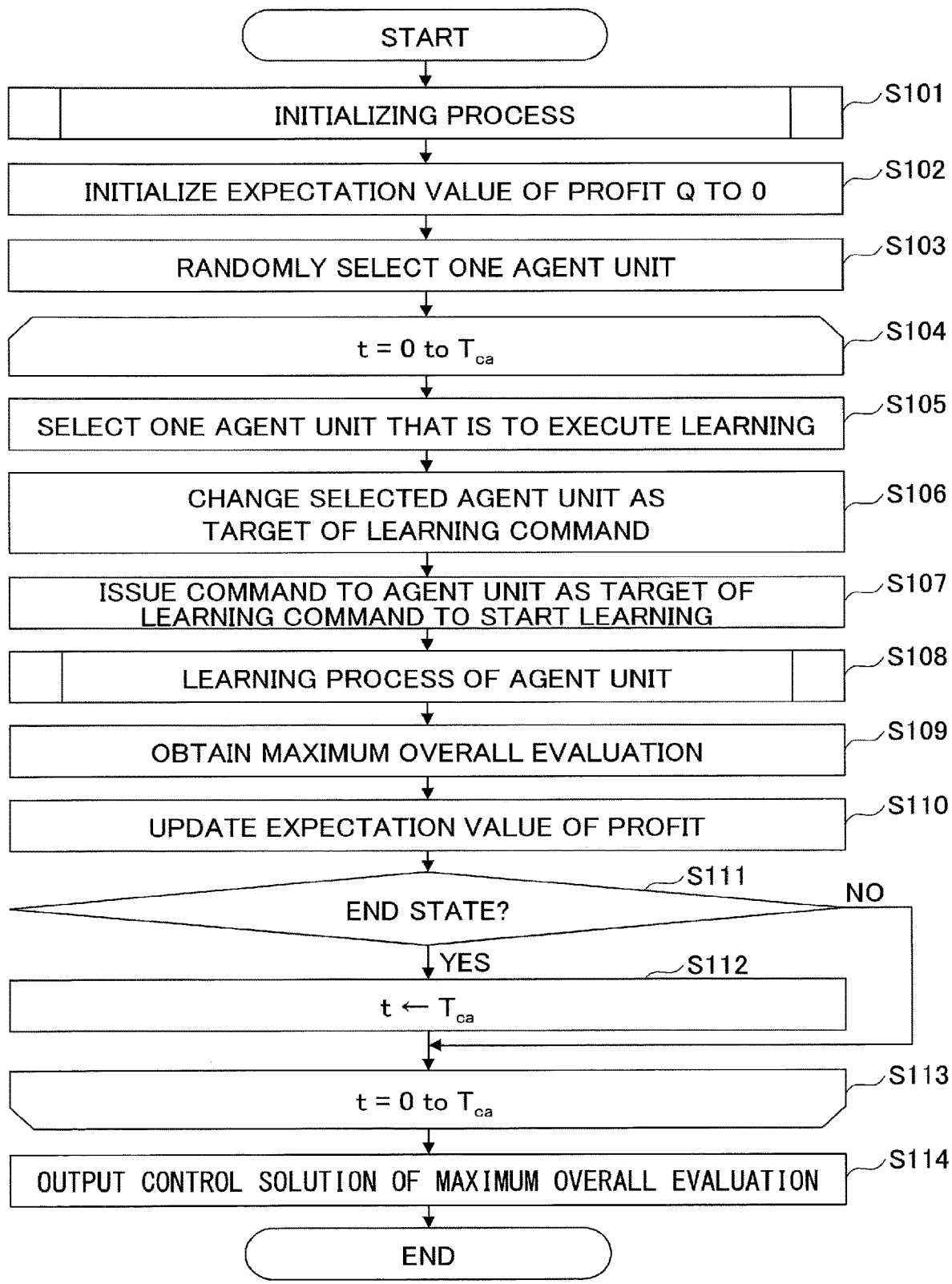
FIG. 7 is a flow chart illustrating a control process executed by an integrated control engine unit in an application example.

A control process (NFV control process) executed by the integrated control engine unit 200 according to the application example will be described with reference to FIG. 7. FIG. 7 is a flow chart illustrating a control process executed by the integrated control engine unit 200 according to the application example. Note that the control process illustrated in FIG. 7 is executed, for example, at predetermined time intervals. However, for example, the control process may be executed when the input information management unit 800 receives a user demand as input.

Before describing the control process illustrated in FIG. 7, variables used in the control process are defined. First, variables used in the entire integrated control engine unit 200 are defined by the following Notation 1.

Notation 1
ca: Learning command agent unit 410
a∈A={VM,IDS}: Set of agent units 470
e∈E={TE,VM,IDS}: Set of control engine units 900
T: Entire learning period
$T_{ca} \subset T$: Learning period of learning command agent unit 410
$T_a \subset T$: Learning period of an agent unit 470

$$r_t = \frac{\alpha}{U_{max}^{link}} + \frac{\beta}{U_{max}^{server}}: \text{Overall evaluation at step } t$$

α,β: Weight parameter representing importance of control policy
$Q(s_t, a_t)$: Expectation value of the sum of overall evaluation (profit) to be obtained in the future if an action $a_t$ is selected in a state $s_t$ at step t Next, variables used mainly in the path control engine unit 500 are defined by the following Notation 2.

Notation 2
G(N,L): Valid graph (N: set of nodes, L: set of links)
n∈N: Node
link(i,j)∈L: Link from node i to node j
$c_{ij}$: Link Capacity of link(i,j)
$T^{vm} = \{t_{ij}^{vm}\}$: Traffic demand from VMi to VMj
$T^{server} = \{t_{pq}\}$: Traffic demand from node p to node q
$x_{ij}^{pq}$: Passing rate of traffic demand $t_{pq}$ passing through link(i,j) (variable)
$U_{max}^{link}$: Maximum link utilization (objective function (scale of evaluation))

Next, variables used mainly in the VR arrangement control engine unit 600 and the VNF arrangement control engine unit 700 are defined by the following Notation 3.

Notation 3
$N_{vm}$: Number of VMs, $N_{ids}$: Number of IDSs, $N_{server}$: Number of server devices 10
$v_i \in V$: i-th VM (V: set of VMs)
$i_i \in I$: i-th IDS (I: set of IDSs)
$s_i \in S$: i-th server device 10 (S: set of server devices 10)
$c_i^{vm}$: Size of i-th VM
$c_i^{ids}$: Size of i-th IDS
$R^j$: Capacity of j-th server device 10
$A^{vm} = \{a_{ij}^{vm}\}$: Control solution of VM, 1 if $V_i$ is assigned to $S_j$, or 0 otherwise (variable)
$A^{ids} = \{a_{ij}^{ids}\}$: Control solution of IDS, 1 if $I_i$ is assigned to $S_j$, or 0 otherwise (variable)
$U_{max}^{server}$: Maximum server utilization (objective function (scale of evaluation))

Next, variables used mainly in the learning command agent unit 410 are defined by the following Notation 4.

Notation 4
$s_t^{ca} \in s^{ca} \subseteq A$: State of the learning command agent unit 410 at step t
$a_t^{ca} \in a^{ca} \subseteq A$: Action of the learning command agent unit 410 at step t
$r_t^{ca} = \max_{t' \in T_a} \{r_{t'}\}$: Reward of the learning command agent unit 410 at step t Next, variables used mainly in the VR control agent unit 430 are defined by the following Notation 5.

Notation 5

$s_t^{vm} \in s^{vm} \subseteq A^{vm}$: State of the VR control agent unit 430 at step t $a_t^{vm} \in a^{vm} \subseteq S$: Action of the VR control agent unit 430 at step t $r_t^{vm}$: Reward of the VR control agent unit 430 at step t Finally, variables used mainly in the VNF control agent unit 440 are defined by the following Notation 6.

Notation 6

$s_t^{ids} \in s^{ids} \subseteq A^{ids}$: State of the VNF control agent unit 440 at step t $a_t^{ids} \in a^{ids} \subseteq S$: Action of the VNF control agent unit 440 at step t $r_t^{ids}$: Reward of the VNF control agent unit 440 at step t First, each control engine unit 900 (the path control engine unit 500, the VR arrangement control engine unit 600, and the VNF arrangement control engine unit 700) executes an initialization process (S101).

Figure 8:
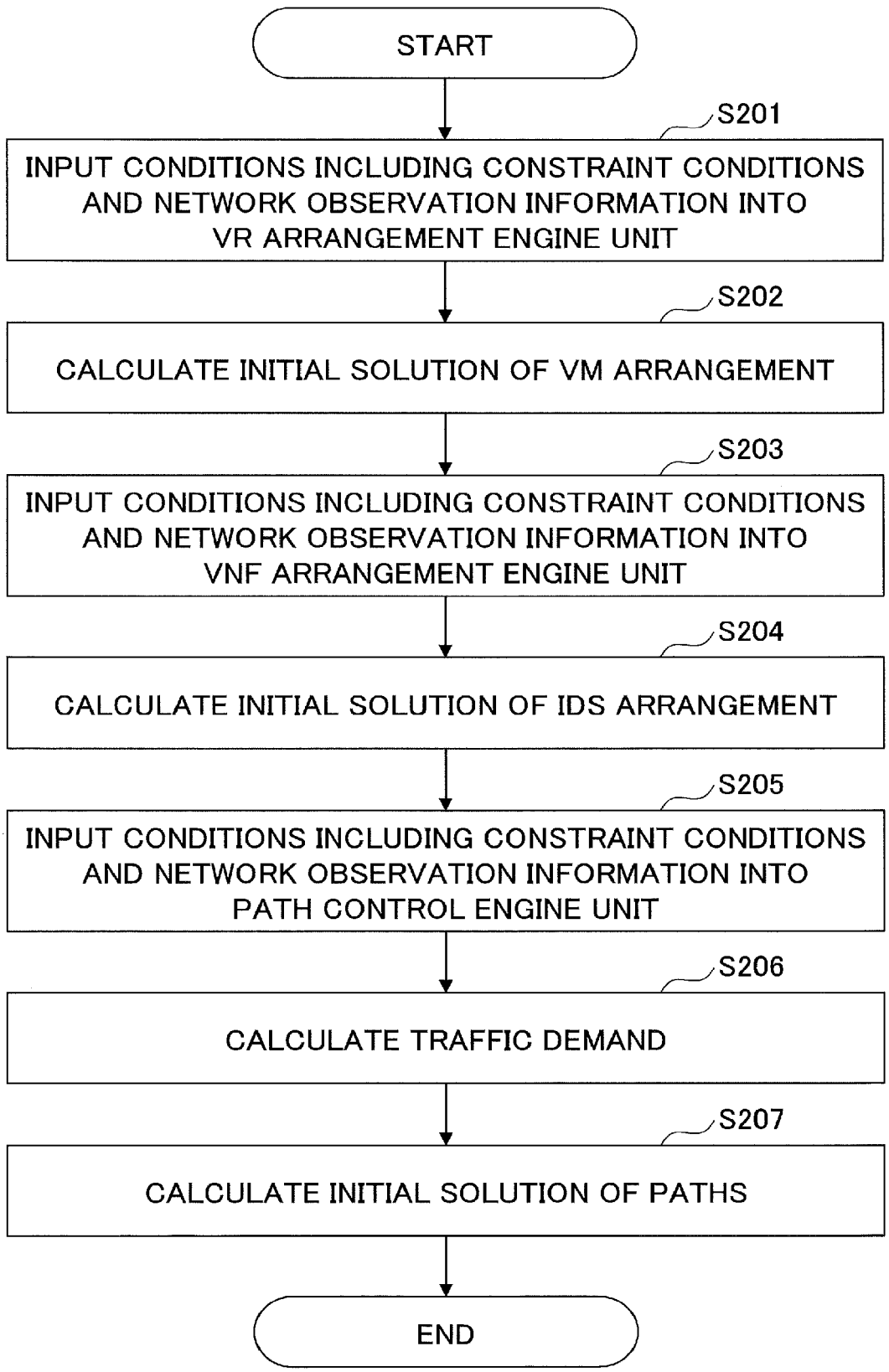
FIG. 8 is a flow chart illustrating an initialization process in an application example.

Here, the initialization process of each control engine unit 900 will be described with reference to FIG. 8. FIG. 8 is a flow chart illustrating the initialization process in the application example.

First, the VR arrangement control engine unit 600 receives, as input, input conditions expressed in the following Notation 7 (S201). Note that these input conditions include constraint conditions input from the input information management unit 800 and network observation information input from the server devices 10.

Notation 7

Input conditions: $N_{vm}$, $N_{server}$, $c_i^{vm}$, $R_j$, $T^{vm}$

Next, the VR arrangement control engine unit 600 solves a mathematical optimization problem expressed in the following Notation 8 by the VR arrangement calculation unit 610, so as to calculate an initial solution $A^{vm}$ (S202).

Notation 8 objective: min: $U_{max}^{server}$ s.t.: $\sum_{j \in S} a_{ij}^{vm} = 1 (\forall i \in V)$ $\sum_{i \in V} c_i^{vm} a_{ij}^{vm} \leq R_j U_{max}^{server} (\forall j \in S)$ $a_{ij}^{vm} \in [0, 1]$ $0 \leq U_{max}^{server} \leq 1$ Next, the VNF arrangement control engine unit 700 receives, as input, input conditions expressed in the following Notation 9 (S203). Note that these input conditions include the constraint conditions input from the input information management unit 800 and the network observation information input from the server devices 10.

Notation 9

Input conditions: $N_{ids}$, $N_{server}$, $c_i^{ids}$, $R_j$

Next, the VNF arrangement control engine unit 700 solves a mathematical optimization problem expressed in the following Notation 10 by the VNF arrangement calculation unit 710, so as to calculate an initial solution $A^{ids}$ (S204).

Notation 10 objective: min: $U_{max}^{server}$ s.t.: $\sum_{j \in S} a_{ij}^{ids} = 1 (\forall i \in V)$ $\sum_{i \in V} c_i^{ids} a_{ij}^{ids} \leq R_j U_{max}^{server} (\forall j \in S)$ $a_{ij}^{ids} \in [0, 1]$ $0 \leq U_{max}^{server} \leq 1$ Next, the path control engine unit 500 receives, as input, input conditions expressed in the following Notation 11 (S205). Note that these input conditions include the constraint conditions input from the input information management unit 800 and network observation information input from the transfer device 20.

Notation 11

Input conditions: $N_{server}$, $C_{ij}$, $T^{vm}$

Next, the I/O converter unit 460 converts a traffic demand $T^{vm}$ between the VMs into a traffic demand between the server devices 10 (S206), and substitutes the converted traffic demand for the variable $T^{server}$.

Next, the path control engine unit 500 solves a mathematical optimization problem expressed in the following Notation 12 by the path calculation unit 510, so as to calculate an initial solution $x_{ij}^{pq}$ (S207).

Notation 12 objective: min: $U_{max}^{link}$ s.t.: $\sum_{j:(i,j) \in L} x_{ij}^{pq} - \sum_{j:(i,j) \in L} x_{ji}^{pq} = 0$ $(\forall p, q \in T^{server}, i \neq p, i \neq q)$ $\sum_{j:(i,j) \in E} x_{ij}^{pq} - \sum_{j:(i,j) \in E} x_{ji}^{pq} = 1$ $(\forall p, q \in T^{server}, i = p)$ $\sum_{p,q \in T^{server}} t_{pq} x_{ij}^{pq} \leq c_{ij} U_{max}^{link}$ $(\forall (i, j) \in L)$ $0 \leq x_{ij}^{pq} \leq 1 (\forall (i, j) \in L, \forall p, q \in T^{server})$ $0 \leq U_{max}^{server} \leq 1$ As described above, the initial solutions are calculated by the respective control engine units 900 (the path control engine unit 500, the VR arrangement control engine unit 600, and the VNF arrangement control engine unit 700).

Referring back to FIG. 7, subsequent to S101, the learning command agent unit 410 initializes an expectation value Q of profit (i.e., the sum of overall evaluations to be obtained in the future) to 0 (S102). In other words, the learning command agent unit 410 executes substitution expressed in the following Notation 13.

Notation 13

$Q(s^{ca}, a^{ca}) \leftarrow 0$

Next, the learning command agent unit 410 randomly selects one agent unit 470 from among a set A of the agent units 470 (S103), and substitutes the selected agent unit 470 for the variable expressed in the following Notation 14. In other words, a state of the agent unit 470 having been selected is set as the state $s_t^{ca}$ of the learning command agent unit 410 at step t=0.

Notation 14

Variable: $s_0^{ca}$

Next, the learning command agent unit 410 repeatedly executes subsequent S104 to S113 by incrementing t one by one from step t=0 to step t=$T_{ca}$.

The learning command agent unit 410 executes a process and substitution expressed in the following Notation 15 to select one agent unit 470 for learning (S105). In other words, the learning command agent unit 410 selects an action.

Notation 15

$a_t^{ca} \leftarrow \epsilon\_greedy(s_t^{ca})$ where $\epsilon$-greedy($s_t^{ca}$) means a strategy of the learning command agent unit 410, which selects one agent unit 470 by an $\epsilon$-greedy method. In the $\epsilon$-greedy, the learning command agent unit 410 randomly selects an action (i.e., randomly selects an agent unit 470), for example, with a probability of $\epsilon$, or selects an action that maximizes the expectation value Q at step t with a probability of 1-$\epsilon$.

Next, the learning command agent unit 410 executes a process and substitution expressed in the following Notation 16 to change the target of the learning command to the agent unit 470 selected at S105 (S106). In other words, the learning command agent unit 410 executes an action to cause a state transition.

Notation 16

$s_{t+1}^{ca} \leftarrow action(a_t^{ca})$ where action($a_t^{ca}$) means an action of the learning command agent unit 410. In other words, the learning command agent unit 410 switches the target of the learning command to the agent unit 470 selected at S105 described above, to cause a transition from a state $s_t^{ca}$ to a state $s_{t+1}^{ca}$.

Next, the learning command agent unit 410 executes a process expressed in the following Notation 17 to issue a learning command to the agent unit 470 to which the target of the learning command has been changed at S106 described above (S107).

Notation 17 agent_learning(a)

where $a = s_{t+1}^{ca}$ and agent_learning(a) means to issue a learning command to "a" (an agent unit 470 that has been selected at S105 described above, to which the target of the learning command has been changed at S106 described above) included in the set A of the agent units 470.

Next, the agent unit 470 commanded to learn at S107 executes a learning process (S108). In the learning process of the agent unit 470, a maximum overall evaluation (i.e., a reward of the learning command agent unit 410) $r_{t'}$ and a control solution with which the maximum overall evaluation $r_{t'}$ is obtained are output. The learning process of the agent unit 470 will be described later in detail.

Next, the learning command agent unit 410 substitutes the maximum overall evaluation $r_{t'}$ output in the learning process of the agent unit 470 for the variable expressed in the following Notation (S109). Thus, the learning command agent unit 410 obtains the reward.

Notation 18

Variable: $r_{t+1}^{ca}$

Next, the learning command agent unit 410 executes calculation and substitution expressed in the following Notation 19 to update the expectation value Q of the profit. In other words, the learning command agent unit 410 updates the expectation value of the profit from the state, action, and reward. Update of the expectation value of the profit means that the learning command agent unit 410 is learning a strategy.

Notation 19

$$Q(s_t^{ca}, a_t^{ca}) \leftarrow Q(s_t^{ca}, a_t^{ca}) + \alpha \left[ r_{t+1}^{ca} + \gamma \max_{a'^{ca}} Q(s_{t+1}^{ca}, a'^{ca}) - Q(s_t^{ca}, a_t^{ca}) \right]$$

Next, the learning command agent unit 410 determines whether or not the state ($s_{t+1}^{ca}$) at step t+1 is the end state (S111). The end state is, for example, a case where a control solution with predetermined precision has been calculated. The end state may be a case where the number of steps has exceeded a predetermined number.

If determined at S111 described above that it is the end state, the learning command agent unit 410 substitutes $T_{ca}$ for t (S112). This enables the learning command agent unit 410 to leave the repetition of S104 to S113 so as to execute S114 as will be described below.

The learning command agent unit 410 outputs control solutions output in the respective learning processes of the agent units 470 (i.e., optimum control solutions with which a maximum overall evaluation is obtained) to the respective control engine units 900 corresponding to the agent units 470 (S114). This enables, for example, the VR arrangement control engine unit 600 to transmit a setting command corresponding to the control solution to the server device 10 by the VR arrangement setting unit 620, so as to control the arrangement of the VR (a VM in the present application example) to be controlled. Similarly, this enables, for example, the VNF arrangement control engine unit 700 to transmit a setting command corresponding to the control solution to the server device 10 by the VNF arrangement setting unit 720, so as to control the arrangement of the VNF (an IDS in the present application example) to be controlled.

Figure 9:
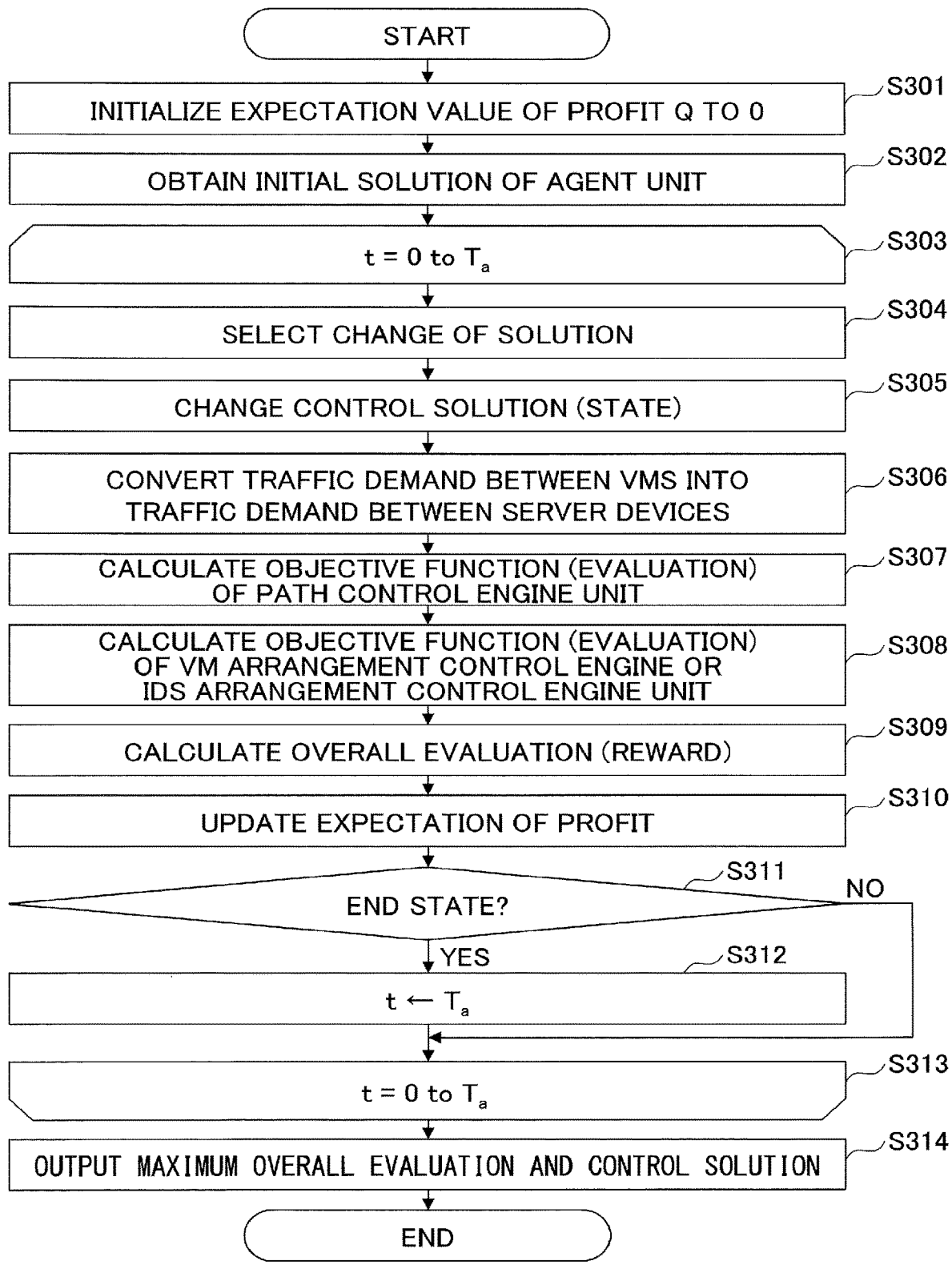
FIG. 9 is a flowchart illustrating a learning process of an agent unit in an application example.

Here, the learning process of the agent unit 470 at S109 described above will be described with reference to FIG. 9. FIG. 9 is a flowchart illustrating the learning process of the agent unit 470 according to the application example.

In FIG. 9 described below, if the agent unit 470 to which a learning command has been issued is the "VR control agent unit 430", "agent" is read as "vm". On the other hand, if the agent unit 470 to which a learning command has been issued is the "VNF control agent unit 440", "agent" is read as "ids".

First, the agent unit 470 initializes the expectation value of the profit Q to 0 (S301). In other words, the agent unit 470 executes substitution expressed in the following Notation 20.

Notation 20

$Q(s^{agent}, a^{agent}) \leftarrow 0$

Next, the agent unit 470 sets an initial solution $A^{agent}$ calculated by the control engine unit 900 corresponding to the agent unit 470 to a variable expressed in the following Notation 21 (S302). In other words, the initial solution $A^{agent}$ of the control engine unit 900 is set as a state $s_0^{agent}$ at step t=0 of the agent unit 470 corresponding to the control engine unit 900.

Notation 21

Variable: $s_0^{agent}$

Next, the agent unit 470 repeatedly executes subsequent S303 to S313 from step t=0 to step t=$T_a$ while incrementing t one by one.

The agent unit 470 executes a process and substitution expressed in the following Notation 22 to select a change in the control solution (S304). In other words, the agent unit 470 selects an action.

Notation 22

$$a_t^{agent} \leftarrow \epsilon\text{-greedy}(s_t^{agent})$$

where $\epsilon\text{-greedy}(s_t^{agent})$ means a strategy of each agent unit 470, which selects a change in the control solution by an $\epsilon$-greedy method. In the $\epsilon$-greedy, the agent unit 470 randomly selects an action (i.e., randomly selects a change in the control solution), for example, with a probability of $\epsilon$, or selects an action that maximizes the expectation value Q at step t with a probability of 1-$\epsilon$.

Next, the agent unit 470 executes a process and substitution expressed in the following Notation 23 to change the control solution selected at S103 described above (S305). In other words, the agent unit 470 executes an action to cause a state transition.

Notation 23

$$s_{t+1}^{agent} \leftarrow \text{action}(a_t^{action})$$

where $\text{action}(a_t^{agent})$ means an action of the agent unit 470. In other words, the agent unit 470 changes the control solution, as the selection at S305 described above, to transition a state $s_t^{agent}$ to a state $S_{t+1}^{agent}$. The action changes part of the control solution. In action, for example, the agent unit 470 randomly selects one VM or IDS from among the most congested server devices 10 to move the VM or IDS based on the strategy.

Next, the I/O converter unit 460 converts the traffic demand $T^{vm}$ between the VMs to the traffic demand between the server devices 10 (S306), and substitutes the converted traffic demand for the variable $T^{server}$.

Next, the path control engine unit 500 solves a mathematical optimization problem expressed in the above Notation 12 by the path calculation unit 510, to calculate the objective function (an evaluation). Then, the path control agent unit 420 substitutes the calculated objective function for the variable expressed in the following Notation 24 (S307).

Notation 24

Variable: $U_{max}^{link}$

Next, the VR arrangement control engine unit 600 or the VNF arrangement control engine unit 700 solves the mathematical optimization problem expressed in the above Notation 8 or the above Notation 10 to calculate the objective function (evaluation). Then, the VR arrangement control engine unit 600 or the VNF arrangement control engine unit 700 substitutes the calculated objective function for the variable expressed in the following Notation 25 (S308).

Notation 25

Variable: $U_{max}^{server}$

Note that at S308 described above, if the agent unit 470 to which the learning command has been issued is the "VR control agent unit 430", the mathematical optimization problem expressed in the above Notation 8 is solved by the VR arrangement control engine unit 600, and the calculated objective function is substituted for the variable expressed in the above Notation 25. On the other hand, if the agent unit 470 to which the learning command has been issued is the "VNF control agent unit 440", the mathematical optimization problem expressed in the above Notation 10 is solved by the VNF arrangement control engine unit 700, and the calculated objective function is substituted for the variable expressed in the above Notation 25.

Next, the overall evaluation calculation unit 450 executes a process and substitution expressed in the following Notation 26 to calculate an overall evaluation (reward) (S309).

Notation 26

$$r_{t+1} \leftarrow \text{calc\_reward}(U_{max}^{link}, U_{max}^{server})$$

where calc_reward means to calculate an overall evaluation from evaluations of all the control engine units 900. In calc_reward, the overall evaluation calculation unit 450 calculates, for example, a weighted average of the inverses of the evaluations of the respective control engine units 900 as the overall evaluation. At this time, the weight given to the inverse of the evaluation of each of the control engine units 900 is based on, for example, importance degrees $\alpha$ and $\beta$ of the control policy of the control engine unit 900.

Next, the agent unit 470 executes calculation and substitution expressed in the following Notation 27 to update the expectation value Q of the profit. In other words, the agent unit 470 updates the expectation value of the profit from the state, action, and reward. Update of the expectation value of the profit means that the agent unit 470 is learning the strategy.

Notation 27

$$Q(s_t^{agent}, a_t^{agent}) \leftarrow Q(s_t^{agent}, a_t^{agent}) + \alpha\left[r_{t+1} + \gamma \max_{a'^{agent}} Q(s_{t+1}^{agent}, a'^{agent}) - Q(s_t^{agent}, a_t^{agent})\right]$$

Next, the agent unit 470 determines whether or not the state $(S_{t+1}^{agent})$ at step t+1 is the end state (S311). The end state is, for example, a case where a control solution with predetermined precision has been calculated. The end state may be a case where the number of steps has exceeded a predetermined number.

If determined at S311 described above that it is the end state, the agent unit 470 substitutes $T_a$ for t (S312). This enables the agent unit 470 to leave the repetition of S303 to S313 so as to execute S314 as will be described later.

The agent unit 470 outputs to the learning command agent unit 410 the maximum overall evaluation and the control solution from which the maximum overall evaluation has been calculated among overall evaluations calculated at S309 described above (S314). In other words, the agent unit 470 outputs the maximum overall evaluation $r_{t'}$ calculated by the following Notation 28, and the control solution $s_{t'}^{agent}$ from which the maximum overall evaluation has been calculated.

$$r_{t'} = \max_{t \in T_a}\{r_t\} \qquad \text{Notation 28}$$

This enables each agent unit 470 to output the maximum overall evaluation and the control solution (i.e., the optimum control solution) from which the maximum overall evaluation has been calculated to the learning command agent unit 410.

<Evaluation of Control Process Executed by Integrated Control Engine Unit 200>

Figure 10:
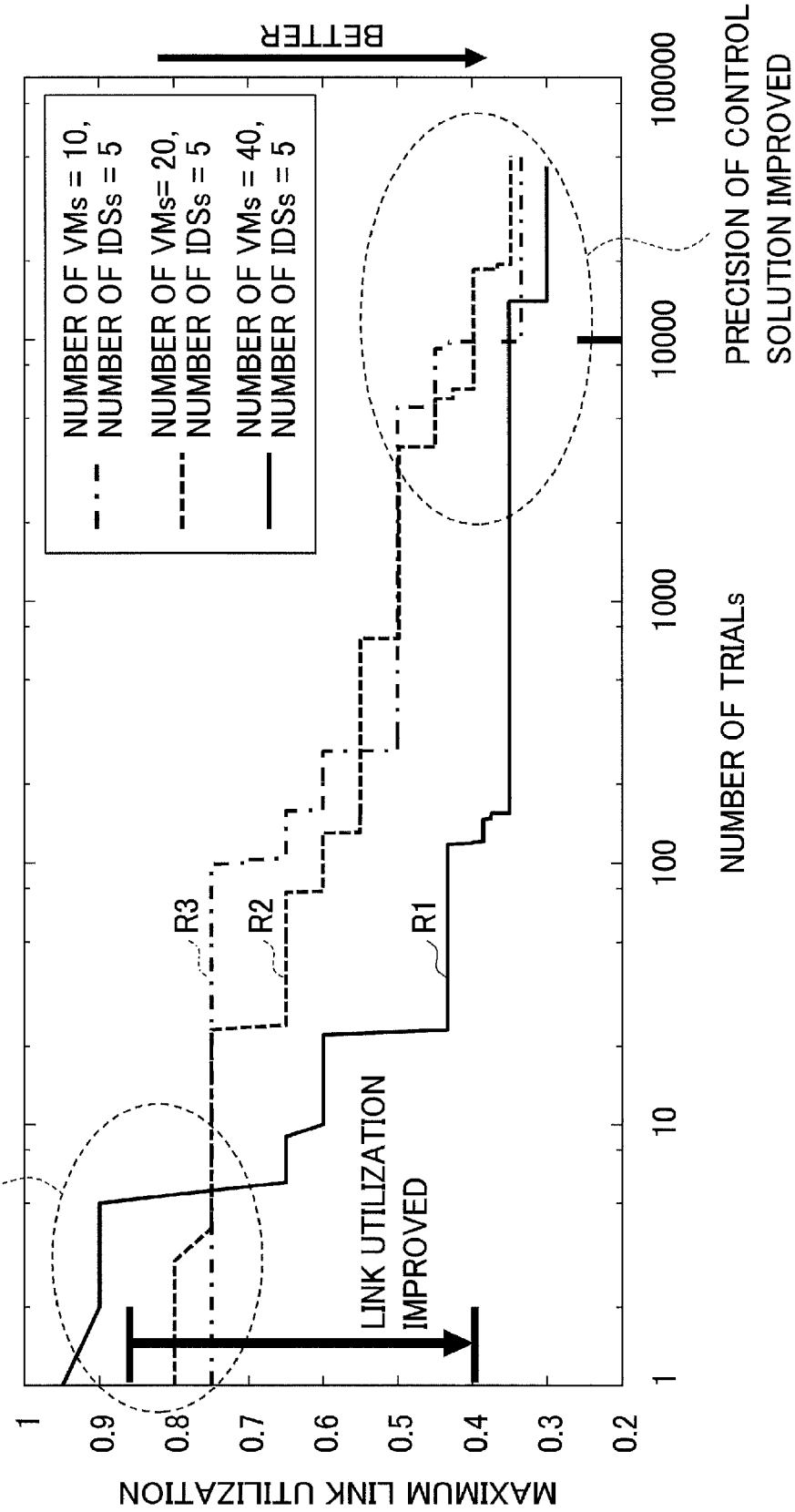
FIG. 10 is a diagram illustrating an example of evaluation of a control process executed by an integrated control engine unit.

Here, evaluation of a control process executed by the integrated control engine unit 200 will be described with reference to FIG. 10. FIG. 10 is a diagram illustrating an example of evaluation of a control process executed by an integrated control engine unit 200.

FIG. 10 illustrates graphs in which the number of trials is set on the horizontal axis and the maximum link utilization is set on the vertical axis. A graph R1 illustrates a result of trials in which "Internet 2" was used as the topology of the physical network 300 and the calculation conditions were set as (the number of VMs, the number of IDSs)=(10 units, 5 units). Similarly, a graph R2 illustrates a result of trials in which "Internet 2" was used and the calculation conditions were set as (the number of VMs, the number of IDSs)=(20 units, 5 units). Also, similarly, a graph R3 illustrates a result of trials in which "Internet 2" was used and the calculation conditions were set as (the number of VMs, the number of IDSs)=(40 units, 5 units).

Note that in these trials, for every user demand, a path that goes through all the IDSs was set. Also, when calculating an end-to-end path, if there exist multiple IDSs as candidates, an IDS that makes the end-to-end path length shorter was selected without taking the IDS load and the like into account.

As illustrated in FIG. 10, it can be understood that as the number of trials increases (i.e., as the learning of the agent unit 470 progresses), the maximum link utilization is improved. For zero trials (i.e., a stage of no learning), the maximum link utilization is as high as 0.75 to 0.95 (i.e., 75% to 95%), and the control solution has poor precision. On the other hand, when the number of trials is increased to around 10,000, the maximum link utilization is reduced below 40% for all the calculation conditions. Therefore, as long as targeting at a system having several tens of VMs, the resource utilization such as the maximum link utilization can be improved twofold or greater with the number of trials of around 10,000.

Thus, according to the present invention, a highly precise control solution can be calculated in which control interference is avoided, while maintaining the high extensibility of the distributed integrated control.

Note that the integrated control engine unit 200 according to the present invention is not limited to control of VRs or NFV. As long as the prerequisites of the control engine units 900 are satisfied, integrated control can be executed over multiple control targets.

Also, the objective of control by the integrated control engine unit 200 according to the present invention is not limited to improvement of the resource utilization efficiency of the physical network 300. For example, it can also be applied to improvement of various control objectives, such as quality, power, security, and the like.

Further, the method of implementing the integrated control engine unit 200 according to the present invention is not limited to the method of reinforcement learning. For example, by replacing a control solution of the control engine unit 900 with a "gene", and a change of a control solution with a genetic manipulation such as "selection" or "crossover", it is possible to implement the method by using techniques of genetic algorithms.

The present invention is not limited to the above embodiments specifically disclosed, and various modifications and changes can be made without deviating from the scope of the claims.

The present application is based on a base application No. 2017-017913 in Japan, filed on Feb. 2, 2017, the entire contents of which are hereby incorporated by reference.

LIST OF REFERENCE SYMBOLS 10 server device
20 transfer device
30 user terminal
100 network control device
200 integrated control engine unit
300 physical network
400 information sharing engine unit
410 learning command agent unit
420 path control agent unit
430 VR control agent unit
440 VNF control agent unit
450 overall evaluation calculation unit
460 I/O converter unit
500 path control engine unit
600 VR arrangement control engine unit
700 VNF arrangement control engine unit
800 input information management unit

The invention claimed is:

1. A control device comprising:
processing circuitry configured to
implement a plurality of control engines each configured to control one or more virtual elements, acting as control targets, that are arranged on a physical network and different than the control engines, each of the control targets being at least one of a path, a virtual resource (VR), and a virtual network function (VNF);
calculate for each control target a control solution for controlling said each control target, the control solution being information representing the amounts of the physical resources of the physical network allocated to the control targets;
calculate, for each control engine, an evaluation of the control solution for said each control target by inputting the control solution into an objective function;
change the control solution based on the calculated evaluation; and
control said each control target based on the changed control solution,
wherein the control device is
connected to the physical network,
receives network observation information from the physical network, and
automatically controls arrangement of a virtual network function in the physical network based on the network observation information, and
wherein the processing circuitry calculates an overall evaluation from the calculated evaluation from each control engine, and based on the overall evaluation, changes the control solution, the overall evaluation being optimal solution based on the calculated evaluations of the control solution for said each control target calculated for each control engine,
wherein the processing circuitry is configured to
implement an information sharing engine that outputs the optimal solution to each control engine, the information sharing engine including one or more agent units configured to learn to change the control solution through reinforcement learning, to change the control solution based on the overall evaluation for said each control target, and
learn to select one agent unit from among the one or more agent units through reinforcement learning, to issue a command to the selected one agent unit to execute learning.

2. The control device as claimed in claim 1, wherein the processing circuitry calculates an evaluation of the changed control solution changed, and
wherein the processing circuitry repeatedly changes the control solution based on the calculated evaluation calculated.

3. The control device as claimed in claim 1, wherein the agent unit learns to change the control solution through the reinforcement learning in which the control solution represents a state, the change of the control solution represents an action, and the overall evaluation represents a reward, and
wherein the processing circuitry learns to select one agent unit from among the one or more agent units through the reinforcement learning in which a selection state of the one or more agent units represents a state, a selection of the one agent unit from among the one or more agent units represents an action, and a maximum overall evaluation obtained while the selected one agent unit executes learning represents a reward.

4. A control method, implemented by processing circuitry of a control device, comprising:
   implement a plurality of control engines each configured to control one or more virtual elements, acting as control targets, that are arranged on a physical network and different than the control engines, each of the control targets being at least one of a path, a virtual resource (VR), and a virtual network function (VNF);
   calculating for each control target a control solution for controlling said each control target, the control solution being information representing the amounts of the physical resources of the physical network allocated to the control targets;
   calculating, for each control engine, an evaluation of the control solution for said each control target by inputting the control solution into an objective function;
   changing the control solution based on the calculated evaluation; and
   controlling said each control target based on the changed control solution,
   wherein the control device is
      connected to the physical network,
      receives network observation information from the physical network, and
      automatically controls arrangement of a virtual network function in the physical network based on the network observation information, and
   wherein the method includes calculating an overall evaluation from the calculated evaluation from each control engine, and based on the overall evaluation, changing the control solution, the overall evaluation being optimal solution based on the calculated evaluations of the control solution for said each control target calculated for each control engine,
   wherein the control method further includes:
   implementing an information sharing engine that outputs the optimal solution to each control engine, the information sharing engine including one or more agent units configured to learn to change the control solution through reinforcement learning, to change the control solution based on the overall evaluation for said each control target, and
   learning to select one agent unit from among the one or more agent units through reinforcement learning, to issue a command to the selected one agent unit to execute learning.

5. A non-transitory computer-readable recording medium having a program stored thereon for causing processing circuitry of a control device to execute a control method, the method comprising:
   implement a plurality of control engines each configured to control one or more virtual elements, acting as control targets, that are arranged on a physical network and different than the control engines, each of the control targets being at least one of a path, a virtual resource (VR), and a virtual network function (VNF);
   calculating for each control target a control solution for controlling said each control target, the control solution being information representing the amounts of the physical resources of the physical network allocated to the control targets;
   calculating, for each control engine, an evaluation of the control solution for said each control target by inputting the control solution into an objective function;
   changing the control solution based on the calculated evaluation; and
   controlling said each control target based on the changed control solution,
   wherein the control device is
      connected to the physical network,
      receives network observation information from the physical network, and
      automatically controls arrangement of a virtual network function in the physical network based on the network observation information, and
   wherein the method includes calculating an overall evaluation from the calculated evaluation from each control engine, and based on the overall evaluation, changing the control solution, the overall evaluation being optimal solution based on the calculated evaluations of the control solution for said each control target calculated for each control engine,
   wherein the control method further includes:
   implementing an information sharing engine that outputs the optimal solution to each control engine, the information sharing engine including one or more agent units configured to learn to change the control solution through reinforcement learning, to change the control solution based on the overall evaluation for said each control target, and
   learning to select one agent unit from among the one or more agent units through reinforcement learning, to issue a command to the selected one agent unit to execute learning.

* * * * *